United States Patent [19]

Siebert et al.

[11] Patent Number: 5,268,452
[45] Date of Patent: Dec. 7, 1993

[54] RLP MODIFIED UNSATURATED POLYESTER RESINS BLENDED WITH REACTIVE LIQUID POLYMERS

[75] Inventors: Alan R. Siebert, Orange Village; Robert J. Bertsch, Brecksville, both of Ohio

[73] Assignee: The B.F. Goodrich Company, Akron, Ohio

[21] Appl. No.: 918,817

[22] Filed: Jul. 22, 1992

[51] Int. Cl.$^5$ .............................................. C08F 20/00
[52] U.S. Cl. ................................. 525/437; 528/272; 528/296; 528/297; 528/303; 528/306; 528/308; 528/392; 525/31; 525/33; 525/44; 525/45; 525/46; 525/65; 525/66; 525/119; 525/165; 525/168; 525/295; 525/329.1; 525/329.7; 525/329.9; 525/438; 525/445; 525/449; 524/81; 524/849; 524/850; 523/400; 523/407; 523/408; 523/411; 523/412; 523/500
[58] Field of Search ............... 528/272, 296, 297, 303, 528/306, 308, 392; 525/437, 438, 445, 449, 31, 33, 44, 45, 46, 65, 66, 119, 165, 168, 295, 329.1, 329.7, 331.9; 524/849, 81, 850; 523/400, 407, 408, 411, 412, 500

[56] References Cited

U.S. PATENT DOCUMENTS

| | | | |
|---|---|---|---|
| 3,135,716 | 11/1958 | Uraneck | 525/122 |
| 3,285,949 | 4/1964 | Siebert | 558/358 |
| 3,431,235 | 3/1969 | Lubowitz | 525/122 |
| 3,674,893 | 7/1972 | Nowak et al. | 523/400 |
| 3,699,153 | 7/1970 | Siebert | 560/198 |
| 3,712,916 | 1/1973 | Siebert | 560/198 |
| 3,850,856 | 8/1973 | Dreyfuss | 528/409 |
| 3,910,992 | 9/1974 | Skillicorn | 560/199 |
| 4,013,710 | 6/1975 | Skillicorn | 528/376 |
| 4,129,713 | 11/1976 | Skillicorn | 526/320 |
| 4,290,939 | 3/1980 | Bertsch | 523/527 |
| 4,336,344 | 6/1982 | Craigie | 525/31 |
| 4,530,962 | 11/1982 | Alexander | 525/31 |
| 4,778,851 | 10/1988 | Henton et al. | 525/65 |
| 5,053,496 | 4/1990 | Bertsch | 524/886 |
| 5,140,068 | 3/1991 | Siebert | 525/108 |

FOREIGN PATENT DOCUMENTS 1150205  6/1963  Fed. Rep. of Germany.

*Primary Examiner*—John Kight, III
*Assistant Examiner*—S. Acquah
*Attorney, Agent, or Firm*—David P. Dureska; Debra L. Pawl; George W. Moxon, II

[57] ABSTRACT

Unsaturated polyester resins of the type already having reactive liquid polymers reacted into the backbone of the resins, are cured in the presence of a reactive liquid polymer additive admixed with the prereacted unsaturated polyester resin. Heating of this system during cure causes the reactive liquid polymer additive to miscibilize with the unsaturated polyester resin. The unsaturated polyester resin modified in the manner described above shows a significant enhancement in toughness as measured by fracture energy over unmodified counterparts or counterparts modified by known methods of adduction or admixing alone.

22 Claims, No Drawings

RLP MODIFIED UNSATURATED POLYESTER RESINS BLENDED WITH REACTIVE LIQUID POLYMERS

BACKGROUND OF THE INVENTION

1. Field of the Invention

The present invention relates to blends of unsaturated polyester resins, and in particular to blends of RLP-modified unsaturated polyester base resins with reactive liquid polymers. More particularly, the invention relates to the modification of unsaturated polyester base resins, which already have reactive liquid polymers reacted into their backbones, by admixing or blending reactive liquid polymer additives with the prereacted unsaturated polyester resins and curing the resins using a free radical source. The invention further relates to the above resin in a cured form, a shaped article made from the resin and a method for making the blended resin composition.

2. Background Information

Heretofore, in general, there have been two known methods for modifying or toughening thermoset resins with reactive liquid polymers (hereinafter RLPs) to improve properties such as fracture energy ($G_{Ic}$) and impact strength without adversely affecting the thermo-mechanical properties of the resins. The first prior art method is the adduction or reaction of reactive liquid polymers into the backbone of the thermoset resins. U.S. Pat. No. 4,290,939 relates to coreacting a toughening agent with components of an unsaturated polyester resin in order to introduce the toughening agent into the backbone of the unsaturated polyester resin and thus produce a toughened stable resin. Suitable toughening agents are carboxyl and hydroxyl terminated reactive liquid polymers which are used in an amount of 1 to 30, and preferably 1 to 15 parts by weight per 100 parts by weight of reactant monomers used to prepare the polyester resin. Such adducted systems can be cured in a conventional manner to give elastomer or rubber-modified thermoset resin systems having a significant enhancement in toughness, as measured by fracture energy, over their unmodified counterparts. However, in general, it has been discovered that with unsaturated polyester resins only a finite amount of RLP can be reacted into the backbone of the resin. Attempting to incorporate large amounts of RLP undesirably causes the polyester cook to gel.

A second prior art method of modifying thermoset resins by admixing a RLP with the resin, allows one to incorporate higher levels of rubber, but the polymer additive tends to have limited miscibility with the unsaturated polyester resin. Such a general lack of miscibility between RLPs and unsaturated polyester resins results in the necessity to thoroughly mix the composition prior to use, which is inconvenient and impractical for most applications.

It has now been discovered that by combining the two methods, that is, admixing RLP with an unsaturated polyester resin having RLP reacted into its backbone, higher reactive polymer levels within the unsaturated polyester resin with improved miscibility can be achieved. Moreover, such polymers have comparable or better toughness when compared to polymers obtained by the previous methods at the same elastomer concentrations. Moreover, surprisingly, it has been discovered that significant improvement in toughness (fracture energy) of the inventive unsaturated polyester resins is achieved when the total rubber content is at least 10 phr.

SUMMARY OF THE INVENTION

In one aspect the present invention relates to a toughened unsaturated polyester resin composition comprising the blended product of reactive liquid polymer additive and an unsaturated polyester resin already having a reactive liquid polymer reacted into its backbone. Such a polymer composition overcomes the limitations of past polymers whereby only a limited amount of RLP could be adducted into the backbone of the unsaturated polyester resin and only limited miscibility is achieved when RLP additive is admixed with unsaturated polyester resin.

In another aspect the invention relates to the cured resin described above. In still other aspects, the invention relates to a method for making the blended resin composition, a method for toughening an unsaturated polyester resin and a shaped article made from the blended product unsaturated resin compositions.

DETAILED DESCRIPTION

The present invention relates to a modified unsaturated polyester resin which is the product of admixing RLP additives with unsaturated polyester base resins which already have RLPs reacted into their backbones resulting in improved toughness, as measured by fracture energy and retained thermo-mechanical properties of the polyester resin. Comparable or improved fracture energies of unsaturated polyester resins are achieved by utilizing generally the same total elastomer content or concentration of RLPs as utilized in prior art methods of modification utilizing either the adduction or admixture methods alone. The present invention achieves miscibility of the RLP additive with the prereacted unsaturated polyester base resin, preferably by admixing the RLP additive with the prereacted base resin and subsequently curing the unsaturated polyester resin system using a typical free radical source. However, it is understood that the RLP additive could be admixed with the base resin during cure of the resin with the free radical source. It has been surprisingly found that dramatically improved toughness of the inventive modified unsaturated polyester resin is achieved when using a total rubber (reactive liquid polymer) content of at least 10 phr.

It is to be understood that use of the term "additive" herein in connection with reactive liquid polymers refers to reactive liquid polymers capable of reacting due to their statistical functionality or reactive end groups, but which are admixed or added to the prereacted unsaturated polyester resins in an unreacted or free state, and further which upon curing of the base resins using a free radical source, physically associate or affiliate with the reactive liquid polymers already reacted into the backbones of the base resins to form the modified unsaturated polyester resin of the present invention.

The unsaturated polyester resins useful as starting materials in the present invention are well known in the art and include those derived by condensation of unsaturated dibasic acids or anhydrides containing 4 to 9 carbon atoms with polyols including dihydroxy and trihydroxy compounds containing 2 to 12 carbon atoms. The polyester may include in the polymeric chain varying proportions of other saturated or aromatic dibasic acids and anhydrides which are not subject to cross-linking. The particular noncross-linking moieties and their proportions will depend upon the desired properties of the final product. Maleic, chloromaleic and fumaric acid may be mentioned as exemplary of unsaturated dibasic acids. Aromatic and saturated acids and anhydrides which are exemplary of noncross-linking moieties within the copolymer include phthalic anhydride, orthophthalic acid, meta-phthalic acid, paraphthalic acid, endomethylene-tetrahydropthalic acid, tetrachlorophthalic acid, hexachloroendomethylenetetrahydrophthalic acid, adipic acid, sebacic acid, succinic acid, and the like.

Any of a variety of well known polyols including di and tri-hydroxy compounds containing 2 to 9 carbon atoms, and preferably 2 to 6 carbon atoms, can be used for condensation with the diacids to produce polyesters suitable for use in this invention. Preferred compounds, which are mentioned by way of example of the large number of applicable compounds include ethylene glycol, propylene glycol, 1,2-butanediols, 1,3-butanediols, and 1,4-butanediols, neopentyl glycol, diethylene ether diol, trimethylol propane, and the like.

The method by which the unsaturated polyester resins are made is not critical to this invention. The polyester resin is dissolved in a solvent comprising at least one polymerizable monomer which is copolymerizable with the dissolved polyester. The polymerizable monomer not only acts as a solvent but also copolymerizes with the unsaturated groups along the polyester chain. Polymerizable monomers which can be used in this invention include polymerizable vinylidene compounds having at least one terminal $CH_2=C<$ group containing 2 to 12 carbon atoms, and preferably 3 to 10 carbon atoms. A wide variety of these compounds are known including both aliphatic and aromatic unsaturated hydrocarbons and hydrocarbon derivatives, such as esters, acids and nitriles. Examples of suitable polymerizable monomers are styrene, methyl styrene, acrylonitrile, methyl acrylate, methyl methacrylate, vinyl acetate, allyl esters of phthalic, adipic, maleic, malonic, and cyanuric acids. Styrene and methyl styrene are particularly useful polymerizable monomers. Commercial unsaturated polyester resins are normally sold as a liquid solution with the unsaturated polyester resin dissolved in the polymerizable monomer.

In the preparation of the polyester resins, the acid and/or anhydride are charged into a reaction vessel, together with carboxyl, hydroxyl or epoxy terminated liquid polymer, propylene glycol, and an inhibitor such as quinone or hydroquinone. These reagents are heated to about 175° to 250° C. and reacted under a blanket of nitrogen with removal of water. The reaction is complete when the desired amount of water has been removed. The mixture can be cooled to about 110° to 170° C. in order to add a portion of the remaining acid or anhydride following which, heating is resumed and water is removed until the desired acid number is reached With carboxyl and hydroxyl terminated liquid polymers, it is desired to continue the reaction until an acid number of about 50 is reached. When using epoxy-terminated RLP, it is possible to stop the reaction at a lower acid number of about 35 without the system gelling. When the desired acid number is reached, the material can be cooled to about 160° to 200° C., poured into a metal pan, and allowed to cool to room temperature as it solidifies. The product at this point is a modified polyester resin containing toughening agents in the polyester resin backbone. The solidified product is crushed or broken up into small pieces and dissolved in a polymerizable monomer, such as styrene, to yield a solution of about 20 to 80 percent solids. Preferred acid number for this product is 10 to 35 and preferred viscosity is 100 to 200 cps.

Suitable RLPs for reaction into the backbone of the unsaturated polyester resin include the following: dicarboxyl-terminated polymers, dihydroxy-terminated polymers, diepoxy-terminated polymers, reaction product statistical monofunctional carboxyl-terminated polymers, reaction product statistical monofunctional hydroxy-terminated polymers, reaction product statistical monofunctional epoxy-terminated polymers, blended product statistical monofunctional carboxyl-terminated polymers, blended product statistical monofunctional hydroxy-terminated polymers and blended product statistical monofunctional epoxy-terminated polymers. Each of these polymer types is described in greater detail below.

Liquid dicarboxyl-terminated polymers useful for reaction into the backbone of the precursor unsaturated polyester resin may be prepared by free-radical polymerization using carboxyl-containing initiators and/or modifiers as disclosed in U.S. Pat. No. 3,285,949 and German Patent No. 1,150,205, and by solution polymerization using lithium metal or organometallic compounds and post-treating the polymers to form carboxyl groups, as disclosed in U.S. Pat. Nos. 3,135,716 and 3,431,235. The polymers can also be prepared by reacting liquid polymers having other than terminal carboxyl groups with compounds so as to yield carboxyl groups. For example, liquid carboxyl-terminated polymers can be prepared from liquid hydroxyl-terminated polymers by reaction with dicarboxylic acids or their anhydrides. Liquid halogen-terminated polymers can be reacted with unsaturated anhydrides in the presence of Lewis acids to yield carboxyl groups. Thus, it is seen that the method of preparing the liquid statistical dicarboxyl-terminated polymer is not critical to the invention. The essential features of the polymer are that it have statistical difunctional terminal carboxyl groups and a polymeric backbone of carbon-carbon linkages.

The dicarboxyl-terminated liquid polymers suitably have Brookfield viscosities of from about 500 cps to about 2,500,000 cps at 25° C., more preferably from about 5000 cps to about 1,200,000 cps, and have polymeric backbones comprising carbon-carbon linkages. The dicarboxyl-terminated liquid polymers typically have carboxyl equivalent weights (gram molecular weight per carboxyl group) from about 300 to about 5,000, and more preferably from about 600 to about 3,000. The carboxyl functional groups are located at least at the ends of a polymer molecule, but there may also be additional groups(s) located pendant to a polymer backbone. The average number of total carboxyl groups typically may be from about 0.5 to about 4 groups per molecule, and more preferably from about 0.7 to about 2.5 groups per molecule.

The backbone carbon-carbon linkages of the dicarboxyl-terminated liquid polymers typically contain polymerized units of at least one vinylidene monomer having at least one terminal $CH_2=C<$ group selected from (a) monoolefins containing 2 to 14 carbon atoms, more preferably 2 to 8 carbon atoms, such as ethylene, propylene, isobutylene, 1-butene, 1-pentene, 1-hexene, 1-dodecene, and the like; (b) dienes containing 4 to 10 carbon atoms, more preferably 4 to 8 carbon atoms, such as butadiene, isoprene, 2-isopropyl-1,3-butadiene, and the like; (c) vinyl and allyl esters of carboxylic acids containing 2 to 8 carbon atoms such as vinyl acetate, vinyl propionate, allyl acetate, and the like; (d) vinyl and allyl ethers of alkyl radicals containing 1 to 8 carbon atoms such as vinyl methyl ether, allyl methyl ether, and the like; and (e) acrylic acids and acrylates having the formula

wherein R is hydrogen or an alkyl radical containing 1 to 3 carbon atoms and $R^1$ is hydrogen or an alkyl radical containing 1 to 18 carbon atoms, more preferably 1 to 8 carbon atoms, or an alkoxyalkyl, alkylthioalkyl, or cyanoalkyl radical containing 2 to 12 carbon atoms, and more preferably 2 to 8 carbon atoms. Preferably $R^1$ is hydrogen or an alkyl radical containing 2 to 8 carbon atoms. Examples of suitable acrylates include ethyl acrylate, butyl acrylate, hexyl acrylate, 2-ethylhexyl acrylate, dodecyl acrylate, octadecyl acrylate, methoxyethyl acrylate, butoxyethyl acrylate, hexylthioethyl acrylate, $\beta$-cyanoethyl acrylate, cyanooctyl acrylate, methyl methacrylate, ethyl methacrylate, octyl methacrylate, and the like. Often two or more types of these polymerized monomeric units are contained in the polymeric backbone.

The vinylidene monomers described above may be polymerized readily with from 0 percent up to about 50 percent by weight, and more preferably from 0 percent up to about 35 percent by weight, of at least one comonomer selected from the group consisting of (f) vinyl aromatics such as styrene, α-methyl styrene, chlorostyrene, vinyl toluene, and the like; (g) vinyl nitriles such as acrylonitrile, methacrylonitrile, and the like; (h) divinyls and diacrylates such as divinyl benzene, divinyl ether, diethylene glycol diacrylate, and the like; (i) amides of α,β-olefinically unsaturated carboxylic acids containing 2 to 8 carbon atoms such as acrylamide, and the like; and (j) allyl alcohol and the like. Liquid polymer compositions comprising polymerized units of a major amount of at least one vinylidene monomer listed in (a) to (e) with a minor amount of at least one comonomer listed in (f) to (j) are within the scope of this invention.

Examples of preferred liquid dicarboxyl-terminated polymers include carboxyl-terminated polyethylene, polyisobutylene, polybutadiene, polyisoprene, poly(ethylacrylate), as well as carboxyl-terminated copolymers of butadiene and acrylonitrile, butadiene and acrylates, and butadiene and styrene. Carboxyl-terminated copolymers of butadiene with acrylonitrile or styrene were found to be especially useful. These polymers may contain from about 50 percent to about 100 percent by weight of butadiene, from about 0 percent to about 40 percent by weight of acrylonitrile or styrene and from about 1 percent to about 15 percent by weight of carboxyl groups, based upon the total weight of the polymer.

Another example of a preferred liquid dicarboxyl-terminated polymer useful for reaction into the backbone of the precursor unsaturated polyester resin is difunctional carboxyl-terminated butadiene-acrylonitrile-acrylic acid type terpolymer.

A commercially available carboxyl-terminated butadiene-acrylonitrile-acrylic acid terpolymer may be approximately represented by the formula:

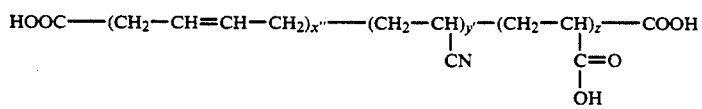

wherein x' represents the number of butadiene units per molecule, y' represents the number acrylonitrile units per molecule, and z represents the number of acrylic acid units per molecule, and further wherein the terpolymer contains from about 17 percent to about 20 percent acrylonitrile and preferably has a molecular weight of from about 2,000 to about 15,000. The terpolymer has a functionality of about 2.3. This polymer is commercially available from The B. F. Goodrich Company as HYCAR TM CTBNX reactive liquid polymer.

Preferred polymers are those known as "HYCAR" polymers CTB, CTBN, and CTBNX commercially available from The B. F. Goodrich Company, U.S.A.

The CTB polymers is a carboxyl-terminated butadiene type polymer and may be generally represented by the formula:

wherein x represents the number of butadiene units per molecule, with x desirably being from about 40 to about 300, and preferably from about 75 to about 85. Hycar CTB has a functionality of about 2.

The CTBN polymer is a carboxyl-terminated butadiene-acrylonitrile type random copolymer which may be generally represented by the formula:

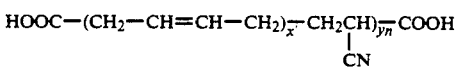

wherein x' represents the number of butadiene units per molecule and y represents the number of acrylonitrile units per molecule, when the random copolymer contains 10 percent acrylonitrile x' is about 0.9 and y is about 0.1, when the random copolymer contains 17 percent acrylonitrile x' is about 0.8 and y is about 0.2, and when the random copolymer contains 26 percent acrylonitrile x' is about 0.7 and y is about 0.3, and with n desirably being from about 40 to about 300, and preferably from about 75 to about 85. The copolymer has a functionality of from about 1.8 to about 1.85.

The CTBNX polymer is a carboxyl-terminated butadiene-acrylonitrile-acrylic acid terpolymer which may be approximately represented by the formula:

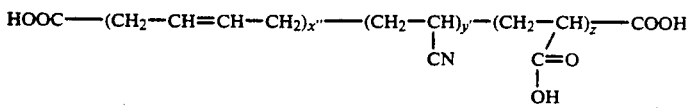

wherein x' represents the number of butadiene units per molecule, y' represents the number of acrylonitrile units per molecule, and z represents the number of acrylic acid units per molecule, and further wherein the terpolymer contains from about 17 percent to about 20 percent acrylonitrile and preferably has a molecular weight of from about 2,000 to about 15,000. The terpolymer has a functionality of about 2.3.

The most preferred carboxyl-terminated polymers are polybutadiene homopolymer α,ω-(4-cyano-4-methyl butyric acid) which is commercially available as HYCAR 2000×162 from The B. F. Goodrich Company and copolymers of 1,3-butadiene/acrylonitrile with α,ω-(4-cyano-4-methyl butyric acid), which is commercially available from The B. F. Goodrich Company, U.S.A. as HYCAR 1300×8 reactive liquid polymer and contains 16% bound acrylonitrile. The best results were obtained using such a copolymer containing 26% bound acrylonitrile, commercially available as HYCAR 1300×13 reactive liquid polymer from The B. F. Goodrich Company, U.S.A.

Liquid dihydroxyl-terminated polymers useful for reaction into the backbone of the precursor unsaturated polyester resin can also be prepared in several different ways. For instance, carboxyl-terminated liquid polymers can be reacted with ethylene oxide in the presence of a tertiary amine catalyst, as described in the Siebert U.S. Pat. No. 3,712,916, or with a diol in presence of an acid catalyst, as described in the Siebert U.S. Pat. No. 3,699,153. These reactive liquid polymers have a Brookfield viscosity at 25° C. in the range of 500 to about 100,000,000, and preferably 5,000 to 2,000,000.

Still another type of dihydroxyl terminated liquid polymers are those containing sulfur linkages near terminal portions thereof and can be prepared by photopolymerizing at least one alkyl acrylate in the presence of a hydroxyl-containing disulfide. Examples of suitable hydroxyl-containing disulfides include 2-hydroxyethyl disulfide, 3-hydroxypropyl disulfide, and the like. Excellent results were obtained using 2-hydroxyethyl disulfide. The disulfide acts both as a polymerization initiator and as a polymerization modifier. The amount of hydroxyl-containing disulfide will vary according to the desired polymeric molecular weight but typically is from about 1 to 20 weight percent, and more preferably from 1 to 10 weight percent, based upon total monomeric weight.

The photopolymerization may be conducted by any method known to the art, including bulk, solution, suspension and emulsion methods. Solvents for the monomer and/or polymer can be used during polymerization, including benzene, aliphatic hydrocarbons such as hexane and heptane, and alcohols such as methanol, ethanol, t-butanol, and the like. Well known suspension techniques comprise suspending the monomeric material, preferably already mixed with the hydroxyl-containing disulfide, in the form of small particles in a nonsolvent liquid such as water, together with a suspending agent to aid in maintaining the particles separate from one another during polymerization. Suitable suspending agents include starch, carboxymethylcellulose, and the like. Emulsion polymerization is similar, except that emulsifiers are used to produce much smaller particles, and the end product is a stable aqueous emulsion of the polymer. Suitable emulsifiers include sodium or potassium fatty acid soaps, sodium alkylaryl sulfonates, and the like.

Ultraviolet (UV) radiation suitable for use in this method have a wavelength of from about 1850 Å to about 6000 Å, and more preferably from about 2,400 Å to about 4,000 Å. Common sources of UV radiation include mercury lamps and arcs, carbon arcs and hydrogen discharge tubes. In some cases, a sensitizer may be useful in catalytic amounts to accelerate the photopolymerization, including ketones such as acetone, benzophenone, and the like.

Dihydroxyl-terminated liquid polymers containing sulfide linkages near the terminal portions of the polymer are also prepared by thermal polymerization, typically at about 80°-90° C., of at least one alkyl acrylate in the presence of at least one hydroxyl-containing disulfide described heretofore, and an initiator such as azoisobutyronitrile. Solvents, suspending agents, sensitizers, etc. may be used as described heretofore.

Air or oxygen has an inhibiting effect on the reactions for preparing statistical dihydroxyl terminated liquid polymers and preferably is excluded from the reaction vessel. Therefore, the reaction vessel desirably is flushed with nitrogen before the vessel is charged and a nitrogen purge may be continued if necessary to exclude air during polymerization. The reaction generally is conducted with stirring at about 80°-90° C., with cooling provided if necessary. The polymerization rate may be monitored by withdrawing reaction mixture samples at periodic intervals for percent conversion analysis. The reaction can be run to 100 percent conversion, but it generally is more economical to run to about 70-98 percent conversion and recover unreacted monomer for reuse. The hydroxyl-containing liquid polymer may be purified by vacuum distillation or by washing with water in order to remove the unreacted hydroxyl-containing disulfide, followed by drying the polymer. The structure of the hydroxyl-containing liquid polymer can be confirmed by infrared analysis, together with well known wet chemical methods for determination of hydroxyl and sulfur content. Number average molecular weights ($M_n$) can be measured using vapor pressure osmometry, gel permeation chromatography, or the like.

The alkyl acrylate liquid polymers containing both terminal and random hydroxyl functionality used in the above-described photopolymerization and thermal polymerization methods may have molecular weights ($M_n$) of from about 1,000 to about 6,000 as determined by cryoscopic, ebullioscopic or osmometric methods; more preferably the molecular weights may be from about 2,000 to about 4,000. The statistical dihydroxylated liquid alkyl acrylate polymers may have Brookfield viscosities at 25° C. of from about 50,000 cps to about 2,000,000 cps, and more preferably from about 200,000 cps to about 1,000,000 cps.

The dihydroxylated liquid acrylate polymers contain polymerized therein at least about 65 wt. percent, and more preferably at least about 85 wt. percent of at least one alkyl acrylate wherein the alkyl group contains from 3 to 10 carbon atoms, and more preferably from 3 to 8 carbon atoms. The alkyl acrylate forms the backbone of the statistical dihydroxylated liquid polymer. Examples of suitable alkyl acrylates as the primary components of the polymer backbone include n-butyl acrylate, n-hexyl acrylate, 2-ethylhexyl acrylate, and the like, and mixtures thereof. Excellent results were obtained using n-butyl acrylate. The statistical dihydroxylated alkyl acrylate liquid polymers can also contain from about 1 to about 20 weight percent N-vinyl-2-pyrrolidone, and preferably from about 2 to about 10 percent. The balance of the polymer, typically from about 0 to 30 weight percent can have copolymerized therein at least one other olefinically unsaturated monomer, more preferably at least one other vinylidene monomer (i.e., a monomer containing at least one terminal $CH_2=C<$ group per molecule) in the polymeric backbone.

Preferred vinylidene comonomers in the polymeric backbone include (a) dienes containing 4 to 10 carbon atoms, and more preferably 4 to 8 carbon atoms, such as butadiene, isoprene, 2-isopropyl-1,3-butadiene, chloroprene, and the like; (b) vinyl nitriles containing 3 to 6 carbon atoms such as acrylonitrile, methacrylonitrile, and the like; and (c) acrylates such as acrylic acid, ethyl acrylate, dodecyl acrylate, octadecyl acrylate, methoxyethyl acrylate, butoxyethyl acrylate, hexylthioethyl acrylate, $\beta$-cyanoethyl acrylate, cyanooctyl acrylate, methyl methacrylate, ethyl methacrylate, octyl methacrylate, and the like. Co-monomeric mixtures may also be used. Excellent results were obtained using butadiene, ethyl acrylate, and/or acrylonitrile comonomers together with n-butyl acrylate as the principal monomer.

Other suitable vinylidene comonomers include (d) vinyl aromatics such as styrene, methyl styrene, chlorostyrene, and vinyl toluene; (e) vinyl and allyl esters of carboxylic acids containing 2 to 8 carbon atoms such as vinyl acetate, vinyl propionate, and allyl acetate; (f) vinyl and allyl ethers of alkyl radicals containing 1 to 8 carbon atoms such as vinyl methyl ether and allyl methyl ether; and (g) monoolefins containing 2 to 14 carbon atoms, and more preferably 2 to 8 carbon atoms, such as ethylene, propylene, isobutylene, 1-butene, 1-pentene, 1-hexene, 1-dodecene, and the like.

Also suitable as vinylidene comonomers are (h) vinyl halides such as vinyl bromide, vinyl chloride, and the like; (i) divinyls and diacrylates such as divinyl benzene, divinyl ether, diethylene glycol diacrylate, and the like; (j) amides of $\alpha,\beta$-olefinically unsaturated carboxylic acids containing 2 to 8 carbon atoms such as acrylamide, and the like; (k) hydroxyl-containing vinylidene monomers for the purpose of including some random hydroxyl functionality, as defined heretofore, such as 2-hydroxyethyl acrylate, allyl alcohol, vinyl benzyl alcohol, and the like; and (l) other vinylidene monomers such as bis($\beta$-chloroethyl) vinyl phosphonate, diacetone acrylamide, and the like. Excellent results were obtained using 2-hydroxyethyl acrylate and diacetone acrylamide.

Another suitable difunctional hydroxyl-terminated polymer is an epihalohydrin type polymer having a number average molecular weight of about 3300, which is described in U.S. Pat. No. 3,850,856 and is hereby fully incorporated by reference.

Still another suitable elastomer which can be utilized for adduction into the unsaturated polyester resin in the present invention, is the diepoxy-terminated type polymers, which is fully described in U.S. Pat. No. 4,530,962, which is hereby fully incorporated by reference.

The low viscosity statistical monofunctional reactive liquid polymer compositions useful in the present invention for reaction into the backbone of the precursor unsaturated polyester resin, generally consist of two different types produced by two distinct processes. More particularly, the first type is a reaction product statistical monofunctional polymer composition, and the second type is a blended product statistical monofunctional polymer composition. It is to be understood that the term "statistical monofunctional" used for describing the reactive liquid polymers useful in the present invention, means that the rubber or elastomer is regarded, statistically, as having 100 percent monofunctional end groups. However, the statistical monofunctional rubber composition may include difunctional, non-functional, and monofunctional species, or alternatively only difunctional and nonfunctional species, as will be described in greater detail below.

The greatest advantage provided by these statistical monofunctional polymers is that their viscosity is approximately one-half ($\frac{1}{2}$) the value of equivalent commercially known difunctional polymers. This is demonstrated by the measured viscosities summarized in Table I and IA below. Table I compares the viscosity of the precursor statistical monofunctional carboxyl-terminated polymers of the present invention versus difunctional carboxyl-terminated polymers having the same compositions of butadiene homopolymers or butadiene-acrylonitrile copolymers. Table IA compares the viscosity of the blended product statistical monofunctional carboxyl-terminated polymers of the present invention versus difunctional carboxyl-terminated polymers having the same compositions of butadiene homopolymers or butadiene/acrylonitrile copolymers. The molecular weights of the difunctional and reaction product monofunctional polymers were identical within experimental error and lot-to-lot variations.

Regarding Table I, polymers "A" and "a" are homopolymers of butadiene while polymers B/b - D/d are butadiene/acrylonitrile copolymers. The polymer designations in upper case letters represent the precursor reaction product statistical monofunctional carboxyl-terminated polymers of the present invention, while the lower case letters represent structurally equivalent difunctional carboxyl-terminated polymers. The designation "EPHR" stands for Equivalents of Carboxyl Per Hundred Parts of Rubber.

TABLE I

Comparative Viscosity of Reaction Product Statistical Monofunctional vs. Difunctional Carboxyl Terminated Polymers

| Polymer | Acrylonitrile Content (% by weight) | Viscosity (mPa · s @ 27° C.) | Carboxyl EPHR |
|---|---|---|---|
| A | — | 22,600 | 0.022 |
| a | — | 60,000 | 0.045 |
| B | 10.2 | 30,600 | 0.025 |
| b | 10.2 | 60,000 | 0.050 |
| C | 16.8 | 65,000 | 0.022 |
| c | 16.8 | 135,000 | 0.052 |
| D | 25.9 | 202,000 | 0.024 |
| d | 25.9 | 500,000 | 0.057 |

Regarding Table IA, polymers A' and a are homopolymers of butadiene while polymers C'/c and D'/d are butadiene/acrylonitrile copolymers. The polymer designations in primed upper case letters represent the blended product statistical monofunctional carboxyl-terminated polymers of the present, while the lower case letters represent structurally equivalent difunctional carboxyl-terminated polymers. The designation "EPHR" stands for Equivalents of Carboxyl Per Hundred Parts of Rubber.

TABLE IA

Comparative Viscosity of Blended Product Statistical Monofunctional vs. Difunctional Carboxyl Terminated Polymers

| Polymer | Acrylonitrile Content (% by weight) | Viscosity (mPa·s @ 27° C.) | Carboxyl EPHR |
|---|---|---|---|
| A' | — | 20,450 | 0.020 |
| a | — | 60,000 | 0.045 |
| C' | 16.8 | 67,400 | 0.025 |
| c | 16.8 | 135,000 | 0.052 |
| D' | 25.9 | 218,000 | 0.028 |
| d | 25.9 | 500,000 | 0.057 |

It will be appreciated by one skilled in the art that the viscosity of individual polymers will vary depending upon the monomeric composition of the polymeric backbone. However, generally the viscosity ranges from about 10,000 mPa·s to about 1.5 million mPa's. For polymers of polybutadiene or polybutadiene and acrylonitrile wherein the acrylonitrile content ranges from 0 percent to about 50 percent by weight of the polymer, the viscosity ranges from about 12,000 mPa's to about 1.5 million mPa·s.

The reaction product statistical monofunctional RLP composition is the reaction product of backbone-forming monomers and a mixture of difunctional and non-functional initiators which product is a blend or a mixture of difunctional polymers, monofunctional polymers, and non-functional polymers, generally containing an average functionality per polymer of from about 0.2 to about 1.8, desirably from about 0.7 to about 1.3, and preferably approximately one, and hence is referred to as a statistical monofunctional polymer. Considering the monofunctional terminated reactive liquid rubber polymer, it contains either a terminal carboxyl group, a terminal epoxy group, or a terminal hydroxyl group at one end of the polymer chain, and a non-reactive or non-functional group at the other end of the polymer chain. Each terminus is derived from a fragment of the initiators used in the synthesis employed to make the polymers. When the particular polymer is a difunctional terminated polymer, it will contain either a terminal carboxyl group or a terminal epoxy group at both ends of the polymer chain. When the polymer is a non-functional polymer, it will contain non-functional groups on each end of the polymer chain.

The reaction product statistical monofunctional carboxyl-terminated reactive polymer can be generally indicated by the structural formula:

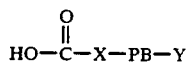

wherein 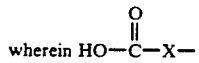

is derived from the difunctional initiator, —Y is derived from the non-functional initiator and —PB— represents the carbon-carbon backbone of the polymer. Generally, the difunctional carboxyl-terminated polymer is represented by the structural formula

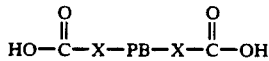

The statistical monofunctional carboxyl-terminated polymers will contain generally a small or minority amount of such difunctional polymers, as well as non-functional polymers generally represented by the structural formula

wherein Y is derived from a non-functional initiator. Regardless of the amounts of the various difunctional, or monofunctional carboxyl-terminated polymers, as well as the non-functional terminated polymers, the overall reaction product statistical monofunctional carboxyl-terminated polymeric compositions generally contain from about 0.25 to about 4.5 percent by weight of carboxyl groups based upon the total weight of the statistical polymeric composition and have an acid number of from about 3.0 to about 52.

The non-reactive terminus —Y of the molecule is referred to as such because it will not undergo condensation or addition reactions, as compared to the carboxyl terminus which will undergo that type of reaction. The composition of the terminus will vary depending upon the polymerization initiators used, however suitable groups include an alkyl or a nitrile.

The backbone —PB— of the reaction product statistical carboxyl-terminated polymer comprises repeating units made from any monomer which is polymerizable by any free radical reaction mechanism. These monomers are referred to herein as backbone-forming monomers. The repeating unit composition of the polymer backbone may be made from a single monomer (homopolymer) or two or more monomers (copolymer). Preferably, the polymeric backbones are derived from at least one vinyl monomer having at least one terminal vinyl (CH$_2$=) group and up to 18 carbon atoms. Examples of suitable vinyl monomers include olefins having from 2 to 10 carbon atoms such as ethylene, isobutylene, dienes containing 4 to 10 carbon atoms, and preferably 4 to 8 carbon atoms, such as butadiene, isoprene (2-methyl-1,3-butadiene), 2-isopropyl-1,3-butadiene and chloroprene (2-chloro-1,3-butadiene); vinyl and allyl esters of carboxylic acids containing 2 to 8 carbon atoms such as vinyl acetate, vinyl propionate and allyl acetate; vinyl and allyl ethers of alkyl radicals containing 1 to 8 carbon atoms such as vinyl methyl ether and allyl methyl ether; and acrylates having the formula

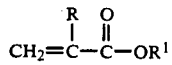

wherein R is hydrogen or an alkyl radical containing 1 to 3 carbon atoms, such as methyl, ethyl, propyl, and isopropyl; R$^1$ is an alkyl radical containing 1 to 18 carbon atoms, and preferably 1 to 8 carbon atoms, or an alkoxyalkyl, alkylthioalkyl, or cyanoalkyl radical containing 2 to 12 carbon atoms, and preferably 2 to 8 carbon atoms. Preferably, $R^1$ is an alkyl radical containing 1 to 8 carbon atoms. Suitable acrylates include ethyl acrylate, butyl acrylate, hexyl acrylate, 2-ethylhexyl acrylate, dodecyl acrylate, octadecyl acrylate, methoxyethyl acrylate, butoxyethyl acrylate, hexylthioethyl acrylate, α-cyanoethyl acrylate, cyanooctyl acrylate, methyl methacrylate, ethyl methacrylate, octyl methacrylate, and the like. The polymeric backbone may comprise homopolymers of the above vinyl monomers or copolymers of two or more of the monomers.

The vinyl monomers described above may also be polymerized readily with up to about 50 percent by weight, but preferably up to about 35 percent by weight, of at least one comonomer such as a vinyl aromatic having the formula $$H_2C=CR^2$$
$$\phantom{H_2C=C}|$$
$$\phantom{H_2C=C}R^3$$

wherein $R^2$ is hydrogen or methyl and $R^3$ is an aromatic moiety having from 6 to 15 carbon atoms resulting in compounds such as styrene, o-methyl styrene, chlorostyrene, and vinyl toluene; a vinyl nitrile having the formula $$\phantom{CH_2=}R^4$$
$$\phantom{CH_2=C}|$$
$$CH_2=C-C\equiv N$$

wherein $R^4$ is hydrogen or methyl, resulting in compounds such as acrylonitrile and methacrylonitrile, respectively; vinyl acids having from 3 to 12 carbon atoms such as acrylic acid, methacrylic acid, and itaconic acid; an amide of olefinically unsaturated carboxylic acids containing 2 to 8 carbon atoms such as acrylamide and methacrylamide; or an allyl alcohol having from 3 to 10 carbon atoms.

Examples of suitable polymeric backbones include homopolymers of polyisoprene, polybutadiene, poly(vinylethylether), poly(ethylacrylate) and poly(butylacrylate); copolymers of butadiene and acrylonitrile, butadiene and styrene, vinyl acetate and isoprene, vinyl acetate and chloroprene, methyl acrylate and butadiene, methyl acrylate and ethyl acrylate, methyl acrylate and butyl acrylate, methyl acrylate and 2-ethylhexyl acrylate, ethyl acrylate and ethylene, ethyl acrylate and isobutylene, ethyl acrylate and isoprene, ethyl acrylate and butadiene, ethyl acrylate and vinyl acetate, ethyl acrylate and styrene, ethyl acrylate and chlorostyrene, ethyl acrylate and n-butyl acrylate, ethyl acrylate and 2-ethylhexyl acrylate; ethyl acrylate and acrylic acid; ethyl acrylate and acrylamide; butyl acrylate and styrene; butyl acrylate and acrylonitrile; butyl acrylate and vinyl chloride; terpolymers of butadiene, acrylonitrile, and acrylic acid; ethyl acrylate, styrene and butadiene; and ethyl acrylate, n-butyl acrylate and 2-ethylhexyl acrylate.

One group of preferred reaction product low viscosity statistical monofunctional carboxyl-terminated reactive liquid polymers has polymeric backbones comprising from about 50 percent to 100 percent by weight of a diene monomer, such as isoprene or butadiene, and up to about 50 percent by weight of a vinyl nitrile comonomer, such as acrylonitrile, or a vinyl aromatic such as styrene. The acrylonitrile content preferably is from about 10 percent to about 35 percent, desirably is from about 16 percent to about 26 percent, and most preferably about 26 percent. Such polymers have a carboxyl content of from about 0.4 percent to about 10 percent by weight, preferably 0.4 percent to about 2.5 percent by weight, based upon the total weight of the polymer. These polymers have a number average molecular weight of from about 1000 to about 12,000.

These low viscosity reaction product statistical monofunctional carboxyl-terminated reactive liquid polymers have further utility in that they also may be reacted to produce polymers having terminal functional groups other than carboxyls, such as epoxies, the formation of which is described in detail below.

Preferred polymers are those known as "HYCAR" polymers CTB, CTBN, and CTBNX commercially available from The B. F. Goodrich Company, U.S.A.

The CTB polymers is carboxyl-terminated butadiene type polymer and may be generally represented by the formula:

$$HOOC + CH_2-CH=CH-CH_2]_{\overline{x}} COOH$$

wherein x represents the number of butadiene units per molecule, with x desirably being from about 40 to about 300, and preferably from about 75 to about 85. Hycar CTB has a functionality of about 2.

The CTBN polymer is a carboxyl-terminated butadiene-acrylonitrile type random copolymer which may be generally represented by the formula:

$$HOOC-(CH_2-CH=CH-CH_2)_{x'}-(CH_2CH)_{\overline{yn}} COOH$$
$$\phantom{HOOC-(CH_2-CH=CH-CH_2)_{x'}-(CH_2CH)_{\overline{yn}}}|$$
$$\phantom{HOOC-(CH_2-CH=CH-CH_2)_{x'}-(CH_2CH)_{\overline{yn}}}CN$$

wherein x' represents the number of butadiene units per molecule and y represents the number of acrylonitrile units per molecule, when the random copolymer contains 10 percent acrylonitrile x' is about 0.9 and y is about 0.1, when the random copolymer contains 17 percent acrylonitrile x' is about 0.8 and y is about 0.2, and when the random copolymer contains 26 percent acrylonitrile x' is about 0.7 and y is about 0.3, and with n desirably being from about 40 to about 300, and preferably from about 75 to about 85. The copolymer has a functionality of from about 1.8 to about 1.85.

The CTBNX polymer is a carboxyl-terminated butadiene-acrylonitrile-acrylic acid terpolymer which may be approximately represented by the formula:

$$HOOC-(CH_2-CH=CH-CH_2)_{x'}-(CH_2-CH)_{y'}-(CH_2-CH)_{\overline{z}}-COOH$$
$$\phantom{HOOC-(CH_2-CH=CH-CH_2)_{x'}-(CH_2-CH)_{y'}}|\phantom{-(CH_2-CH)_{\overline{z}}-}/$$
$$\phantom{HOOC-(CH_2-CH=CH-CH_2)_{x'}-(CH_2-CH)_{y'}}CN\phantom{-}C=O$$
$$\phantom{HOOC-(CH_2-CH=CH-CH_2)_{x'}-(CH_2-CH)_{y'}-(CH_2-CH)_{\overline{z}}}|$$
$$\phantom{HOOC-(CH_2-CH=CH-CH_2)_{x'}-(CH_2-CH)_{y'}-(CH_2-CH)_{\overline{z}}}OH$$

wherein x' represents the number of butadiene units per molecule, y' represents the number of acrylonitrile units per molecule, and z represents the number of acrylic acid units per molecule, and further wherein the terpolymer contains from about 17 percent to about 20 percent acrylonitrile and preferably has a molecular weight of from about 2,000 to about 15,000. The terpolymer has a functionality of about 2.3.

More specifically, the reaction product statistical monofunctional carboxyl-terminated polymer can be made by any conventional addition polymerization technique employing a free radical mechanism. Generally, the reaction is conducted by mixing one or more backbone-forming monomers with a mixture of a difunctional and nonfunctional initiator, and a solvent, then heating. The monomers can be one or more of the polymerizable monomers described hereinabove.

The initiator is a mixture or blend of two different initiators, namely, a difunctional initiator and a nonfunctional initiator capable of initiating a free radical polymerization.

Considering the difunctional initiator, any difunctional initiator can be used. However, one skilled in the art will appreciate that when a difunctional initiator other than an organic acid is used, conversion of the terminal groups to acid groups will be required. For example, the hydroxyl groups on hydrogen peroxide or hydroxy ethyl disulfide require conversion to acid groups. Conventional methods may be used to accomplish the conversion such as by reaction with a cyclic acid anhydride, for example succinic anhydride. Preferably the difunctional initiator is an organic azo compound or a peroxide. The organic azo initiator preferably is a bis-azocyano acid having the formula

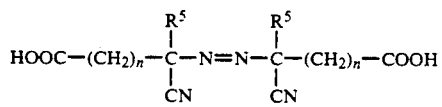

wherein $R^5$ is an alkyl group of 1–3 carbon atoms, and n is an integer from 0 to 6. The preferred acids include azodicyanobutyric acid and azodicyanovaleric acid (ADVA), with ADVA being highly preferred. The preparation of these materials is known and disclosed in U.S. Pat. Nos. 3,285,949 and 2,520,338, which are incorporated herein by reference. The organic azo initiator decomposes to form $N_2$ gas and free radicals having the formula

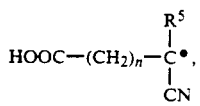

with the portion thereof having the structural formula

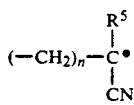

being represented by —X— in the structural formula shown above for the monofunctional carboxyl-terminated polymer. The action of this type of initiator is due to the fact that the azo carbon-nitrogen bond is readily dissociated, as by thermal means.

The preferred difunctional peroxide initiator has the formula

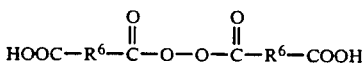

wherein $R^6$ is an alkyl group having from about 2 to about 6 carbon atoms, and preferably 3 carbon atoms. A desirable peroxide is succinic acid peroxide and a preferred peroxide is glutaric acid peroxide. The difunctional peroxide initiator decomposes to form $CO_2$ gas and free radicals having the formula

wherein $R^6$ is represented by X in the structural formula shown above for the reaction product monofunctional carboxyl-terminated polymer useful in the present invention. The action of this type of initiator is due to the fact that the peroxide oxygen-oxygen bond is readily dissociated, as by thermal means.

Considering the non-functional initiator, any non-functional azo or peroxide initiator can be used. Preferably, the azo initiator is a bis-azocyano having the formula

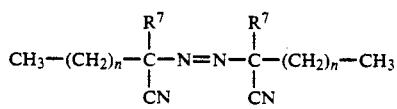

wherein $R^7$ is an alkyl group of 1–3 carbon atoms and n is an integer from 0 to 6. Such compounds are known and disclosed in U.S. Pat. No. 2,556,876. The preferred compound is 2,2'-azobis(2-methylpropionitrile) also known as AIBN. The azo initiator decomposes to form $N_2$ gas and free radicals having the formula

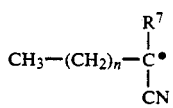

which is represented by —Y as the non-reactive terminus of the reaction product statistical monofunctional carboxyl-terminated polymer described above. The action of this type of initiator also is due to the fact that the azo carbon-nitrogen bond is readily dissociated, as by thermal means.

The non-functional peroxide initiator preferably is an acyl peroxide having the formula

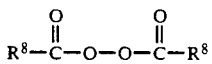

wherein $R^8$ is an aromatic, or an unsubstituted or a substituted alkyl group desirably having from about 1 to about 15 and preferably from about 1 to about 6 carbon atoms. Desirable peroxides include diacetyl peroxide, dilauryl peroxide, didecanoyl peroxide, and diisononanoyl peroxide, with dibenzoyl peroxide being preferred. The non-functional peroxide initiator decomposes to form $CO_2$ gas and free radicals having the formula $\cdot R^8$ which also is represented by Y as the nonreactive terminus of the reaction product statistical monofunctional carboxyl-terminated polymer described above. The action of this type of initiator is also due to the fact that the peroxide oxygen-oxygen bond is readily dissociated, as by thermal means.

The amount of initiators present, on a mole basis, may vary from about 0.2 percent to about 90 percent difunctional initiator and from about 10 percent to about 99.8 percent non-functional initiator. Preferably from about 30 percent to about 75 percent difunctional initiator is used and from about 70 percent to about 25 percent non-functional initiator. Most preferred is from about 60 percent to about 40 percent difunctional initiator and from about 40 percent to about 60 percent nonfunctional initiator. As noted, one skilled in the art will appreciate that the reaction product statistical monofunctional polymer product is a blend or mixture of molecules having different end groups, namely a monofunctional species, a difunctional species and a non-functional species.

The liquid polymerization products can be prepared in any solvent for the initiators, the monomers or the polymers. The solvent is desirably low boiling so it can be readily removed. Such solvents are generally polar and do not act as chain transfer agents. Examples of such solvents include the various ketones having from 2 to about 10 carbon atoms, various alcohols having from 1 to about 7 carbon atoms, various aromatic compounds having from about 6 to about 10 carbon atoms, various esters of a carboxylic acid wherein the ester portion has up to about 4 carbon atoms and the dicarboxylic acid has from about 2 to about 3 or 4 carbon atoms in the non-ester portion, and various ethers including internal ethers having from about 3 to about 7 carbon atoms. Specific examples of suitable solvents include acetone, methyl ethyl ketone, 2pentanone, 3-pentanone, methyl isobutyl ketone, methyl alcohol, ethyl alcohol, n-propyl alcohol, isopropyl alcohol, butyl alcohol, isobutyl alcohol, sec-butyl alcohol, tert-butyl alcohol, benzene, toluene, methyl acetate, ethyl acetate, propyl acetate, and tetrahydrofuran. Acetone is preferred. The reaction temperature may range from about 40° C. to about 120° C., desirably 60° C. to about 100° C., and preferably from about 70° C. to about 90° C. The number average molecular weight (Mn) of the reaction product statistical monofunctional carboxyl-terminated polymers ranges from about 1,000 to about 12,000, based upon the size exclusion chromatography method of determination.

Those skilled in the art will appreciate that in order to form a polymer having uniform composition throughout the charge and maintain constant molecular weight over the length of the polymerization, the initiator, and comonomer if copolymerizing, must be continuously metered throughout the polymerization. Therefore, the reaction product statistical monofunctional carboxyl-terminated polymers are made by a method whereby initially, the reactor is charged with monomer, and a small amount of initiator and comonomer if copolymerizing, and all of the polymerization solvent. The exact amounts of monomers and initiator will vary depending upon the product polymer, however, the amounts can be readily determined experimentally by conventional methods of calculation. Then, after bringing the reaction mixture to reaction temperature, more initiator, and comonomer if copolymerizing, are added during polymerization such that they are continuously metered including incremental addition or a plurality of batch additions, etc. throughout polymerization. Conventional procedures including incremental addition or a plurality of batch additions can be used to recover the resulting reaction products.

No emulsifier is necessary for this process. After polymerization it may be desirable to add conventional additives to the polymer, depending upon its end use, such as thermal stabilizers, including Geltrol ® commercially available from The B. F. Goodrich Company, Akron, Ohio, U.S.A.

The reaction product statistical monofunctional epoxy-terminated reactive polymer alternatively utilized in the present invention for modifying the unsaturated polyester resin is synthesized in the following manner. The reaction product statistical monofunctional carboxyl-terminated polymer is once again utilized. The preparation, structure, formulation, and the like of the statistical carboxyl-terminated prepolymer is set forth hereinabove and accordingly is fully incorporated by reference. Inasmuch as the reaction product statistical epoxy-terminated polymer composition is prepared by reacting one or more epoxy resins as set forth hereinbelow with a reaction product statistical monofunctional carboxyl-terminated polymer composition, the actual composition will contain various monofunctional epoxy-terminated polymers which can be represented by the general structural formula

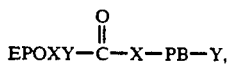

$$\text{EPOXY}-\overset{\overset{\text{O}}{\|}}{\text{C}}-\text{X}-\text{PB}-\text{Y},$$

various difunctional polymers which can be represented by the general structural formula

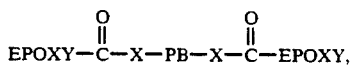

$$\text{EPOXY}-\overset{\overset{\text{O}}{\|}}{\text{C}}-\text{X}-\text{PB}-\text{X}-\overset{\overset{\text{O}}{\|}}{\text{C}}-\text{EPOXY},$$

and various non-functional polymers which can be represented by the general structural formula Y—PB—Y, wherein X, PB, and Y are as set forth hereinabove, and wherein EPOXY is derived from the epoxy resin which is reacted with the reaction product statistical monofunctional carboxyl-terminated polymer composition. Naturally, it is to be understood that during reaction with the statistical monofunctional carboxyl-terminated composition, a ring opening reaction takes place. The reaction between the epoxy resin terminator and the statistical monofunctional carboxyl-terminated polymer composition which will be described in more detail hereinbelow generally takes place in the presence of an inert atmosphere at elevated temperatures utilizing small amounts of catalysts.

Considering the "EPOXY" group, it is generally an epoxy resin known to the art and to the literature and can be various commercially available epoxy resins. Examples of specific epoxy resins or polymers which can be utilized include: polyhydric phenol polyether alcohols; glycidyl ethers of novolac resins such as epoxylated phenol-formaldehyde novolac resin; glycidyl ethers of mono-, di-, and trihydric phenols; glycidyl ethers of bisphenols such as diglycidyl ether of tetrabromobisphenol A; glycidyl ethers of polynuclear phenols; epoxy resin made from diphenolic acid; glycidyl ethers of aliphatic polyols such as chlorine-containing aliphatic diepoxy and polyepichlorohydrin; glycidyl esters such as aliphatic diacid glycidyl esters and epoxidized phenolphthalein; glycidyl epoxies containing nitrogen such as glycidyl amides and amide-containing epoxies; glycidyl derivatives of cyanuric acid; glycidyl resins from melamines; glycidyl amines such as triglycidyl ether amine of p-aminophenol and bis(2,3-epoxypropyl)methylpropylammonium p-toluenesulfonate; glycidyl triazines; thioglycidyl resins such as epoxidized bisulfide; silicon-glycidyl resins such as 1,4-bis[(2,3-epoxypropoxy)dimethylsilyl]; and fluorine glycidyl resins. Other epoxy resins which can be used include those which are synthesized from mono-epoxies other than epihalohydrins including epoxy resins made from unsaturated monoepoxies such as polyallyl glycidyl ether and glycidyl sorbate dimer; epoxy resins from monoepoxy alcohols; epoxy resins from monoepoxies by ester interchange; epoxy resins from glycidaldehyde; polyglycidyl compounds containing unsaturation such as allyl-substituted diglycidyl ether of bisphenol A; epoxy-resin adducts of the above; and epoxy resins which are synthesized from olefins and chloroacetyls such as butadiene dioxide, vinylcyclohexene dioxide, epoxidized polybutadiene, and bis(2,3-epoxycyclopentyl)ether. A more comprehensive list of epoxy resins can be found in *Handbook of Epoxy Resins*, by Henry Lee and Kris Neville, McGraw-Hill, Inc., 1967, which is hereby incorporated by reference.

A highly preferred epoxy resin is diglycidyl ether of bisphenol A (DGEBA) which has the following formula:

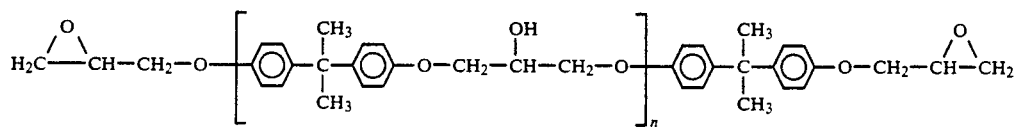

wherein n is an integer from 0 to 18, desirably from 0 to 14.3, and preferably from 0 to 5.5.

The various epoxy resins or polymers generally have a number average molecular weight of from about 200 to about 13,000 The various epoxy polymers generally are difunctional, that is, they have two epoxide groups typically at the terminal portions thereof. The amount of the epoxy resin terminator utilized is such that the mole ratio of epoxy resin terminator to the carboxyl-terminated statistical monofunctional polymer is generally in excess, as from about 0.90 to about 40, desirably from about 0.90 to about 20, and preferably from about 0.95 to about 1.05. Thus, free epoxy resin will generally exist within the reaction product statistical monofunctional epoxy-terminated reactive liquid rubber polymeric compositions.

Reaction of the various epoxy resins with the reaction product statistical carboxyl-terminated reactive polymers generally occurs at elevated temperatures in the presence of an inert atmosphere. Generally, any inert gas can be utilized such as nitrogen, argon, and the like. The reaction generally occurs at temperatures of from about 80° C. to about 180° C., desirably from about 90° C. to about 140° C., and preferably from about 90° C. to about 120° C., generally in the presence of ambient or normal atmospheric temperature. In order to promote reaction, conventional epoxy catalysts are optionally utilized.

One group of catalysts which can be utilized are the various organic phosphines having from 3 to 40 carbon atoms which include various alkyl, various aromatic, various alkyl substituted aromatic, etc., phosphines such as triphenyl phosphine, diethylphenylphosphine, dimethylphenylphosphine, tribenzylphosphine, tri-n-butylphosphine, tri-t-butylphosphine, tricyclohexylphosphine, triethylphosphine, trimethylphosphine, tri-n-octylphosphine, triphenylphosphine, tris(3-chlorophenyl)phosphine, tris(4-chlorophenyl)phosphine, tris(4-fluorophenyl)phosphine, tris(2-hydroxyphenyl)phosphine, tris(3-methoxyphenyl)phosphine, tris(4-methoxyphenyl)phosphine, tris(2-tolyl)phosphine, and tris(3-tolyl)phosphine. A second type of catalyst is the various tertiary amines wherein the hydrocarbyl portion is generally an aliphatic and preferably an alkyl group, an aromatic group, or an aliphatic substituted aromatic, or an aromatic substituted aliphatic group, having a total of from about 1 to about 10 carbon atoms with from about 1 to about 6 carbon atoms being preferred. Examples of specific tertiary amine catalysts include benzyl dimethyl amine, trimethyl amine, triethylamine, and the like. Another group of suitable catalysts are the various alkyltriphenylphosphonium ester or halide salts wherein the alkyl group generally has from 1 to about 10 carbon atoms, and wherein iodide is the preferred halide salt. Examples of such specific catalysts include ethyltriphenylphosphonium acetate, ethyltriphenylphosphonium iodide, n-hexyltriphenylphosphonium bromide, isobutyltriphenylphosphonium bromide, isopropyltriphenylphosphonium bromide.

As noted, although generally desired, the catalysts are optional and hence may not be utilized. When utilized, the amount thereof is generally up to about 1 percent by weight based upon a total weight of the epoxy resin terminator and the statistical monofunctional carboxyl-terminated reactive polymer, desirably up to about 0.5 percent by weight, and preferably from about 0.001 to about 0.1 percent by weight.

In order to reduce the level of residual reactions, the formed reaction product statistical monofunctional epoxy-terminated reactive polymers desirably have a low acid number, such as 2.0 or less, and preferably 0.4 or less. Moreover, the epoxy-terminated reactive polymers also have very low viscosities, such as generally less than 2,000,000 mPa·s, desirably 1,000,000 mPa·s or less, and preferably 500,000 mPa·s or less.

Inasmuch as the epoxy resin reacts with available carboxyl-terminated functional end groups, the overall make-up or content of the reaction product statistical epoxy-terminated reactive liquid rubber polymers will generally contain the same ratios or amounts of reactive epoxy-terminated end groups as the reaction product statistical carboxyl-terminated polymers. Thus, if the statistical carboxyl-terminated polymers are made utilizing approximately 50 percent of a difunctional initiator and 50 percent of a nonfunctional initiator, the statistical epoxy-terminated polymers will contain generally from about 5 percent to about 90 percent of the difunctional specie, from about 90 to about 5 percent of the nonfunctional specie, and from about 5 percent to about 50 percent of the monofunctional specie; desirably from about 10 to about 50 percent of the difunctional specie, from about 10 to about 50 percent of the nonfunctional specie, and up to about 50 percent of the monofunctional specie; and preferably about 25 percent of the difunctional specie, about 25 percent of the nonfunctional specie, and about 50 percent of the monofunctional specie. Hence, as noted above, it is termed a statistical monofunctional epoxy-terminated reactive liquid rubber polymer composition. The ratios of the various species of the statistical polymer will vary depending upon the amount of initiators generally utilized and hence the amount of the difunctional or nonfunctional species can vary widely while the amount of the monofunctional specie can generally not be greater than 50 percent.

The reaction product statistical monofunctional hydroxyl-terminated reactive polymer is the reaction product of reaction product statistical monofunctional carboxyl-terminated liquid polymers reacted with either ethylene oxide in the presence of a tertiary amine catalyst, as described in U.S. Pat. No. 3,712,916 incorporated herein by reference, or with a diol in the presence of an acid catalyst, as described in U.S. Pat. No. 3,699,153 incorporated herein by reference.

The blended product low viscosity statistical monofunctional reactive liquid polymer compositions used in the present invention are generally the blended product of a statistical difunctional carboxyl or epoxy-terminated reactive liquid polymer and a non-functional polymer. Such blending of the statistical difunctional carboxyl or epoxy-terminated reactive liquid polymers with a non-functional polymer results in a statistical monofunctional carboxyl or epoxy-terminated reactive liquid rubber polymer, respectively. Thus, the blended product low viscosity statistical monofunctional reactive liquid polymer includes a blend of a difunctional-terminated polymer which contains either a terminal carboxyl group or a terminal epoxy group at both ends of the polymer chain, and a non-functional polymer which contains non-functional groups on each end of the polymer chain.

The difunctional carboxyl-terminated, hydroxyl-terminated and epoxy-terminated polymers are the same as those described hereinabove. The non-functional polymers which are blended with the various difunctional-terminated polymers described above to form the blended product statistical monofunctional polymers used to modify the unsaturated polyester resins, are well known to the art and to the literature and also have been described hereinabove. As previously stated, but without repeating the details, generally they are represented by the structural formula

Y—PB—Y wherein Y is derived from a non-functional initiator, namely a non-functional azo or peroxide initiator, and —PB— represents the carbon-carbon backbone of the polymer. The non-reactive terminus —Y of the molecule is referred to as such because it will not undergo condensation or addition reaction.

The difunctional and non-functional terminated polymers are brought together and blended in a simple stirrer or mixing device at a temperature of from about 40° C. to about 120° C., desirably from about 50° C. to about 90° C., and preferably from about 50° C. to about 60° C. The amount of difunctional and non-functional polymers present, on a mole basis, may vary from about 0.2 percent to about 90 percent difunctional polymer and from about 10 percent to about 99.8 percent nonfunctional polymer. Desirably from about 30 percent to about 75 percent difunctional polymer is used and from about 70 percent to about 25 percent non-functional polymer. Preferably from about 60 percent to about 40 percent difunctional polymer and from about 40 percent to about 60 percent non-functional polymer, and most preferably a blend of about 50 percent difunctional polymer and about 50 percent non-functional polymer is used. As noted, one skilled in the art will appreciate that the blended monofunctional polymer product is a mixture of molecules having different end groups, namely a difunctional species and a non-functional species. When the various amounts of difunctional and non-functional polymers are utilized in the mole amounts set forth above, it is expected that, statistically, one obtains an average functionality of from about 0.004 to about 1.8, desirably from about 0.6 to about 1.5, preferably from about 0.8 to about 1.2, and most preferably an average functionality of about 1.0. However, as noted above, the blended product statistical monofunctional terminated polymer desirably has an average functionality of approximately 1.

The above-described processes for forming the reaction and blended product low viscosity statistical monofunctional terminated reactive liquid polymers useful in the present invention will be better understood by the following examples, which relate to the formation of the carboxyl-terminated form of the reaction and blended product statistical monofunctional polymers.

EXAMPLE 1

Reaction Product Statistical Monofunctional Carboxyl-Terminated Reactive Liquid Polymer A reaction product statistical monofunctional carboxyl-terminated polymer was obtained in the following experiment. A 20 gallon reactor was cooled to 25° C. and evacuated to suck in 2.08 Kg acrylonitrile, 6.12 Kg acetone and 0.99 Kg initiator solution, in sequence. The initiator solution concentration was 10.3 percent ADVA and 6.03 percent AIBN. The reactor was evacuated until the acetone boiled (about 20–25" Hg), then pressured to 20 psi with nitrogen. This was repeated and the reactor once again evacuated to 20" Hg. The vacuum was broken by charging 38.0 lbs. of butadiene. The mixture was heated to reaction temperature of 85° C. and allowed to react for approximately 13 hours. During polymerization, additional initiator mixture and acrylonitrile were metered into the reaction vessel. Conventional techniques were used to recover the product which had an acid number of 12.9, viscosity at 27° C. of 65,000 mPa's and a bound acrylonitrile content of 16.5 percent.

EXAMPLE 2

Reaction Product Statistical Monofunctional Carboxyl-Terminated Reactive Liquid Polymer A reaction product statistical monofunctional carboxyl-terminated polymer was obtained in the following experiment. A 15 gallon reactor was cooled to 25° C. and evacuated to suck in 3.52 Kg acrylonitrile, 5.58 Kg acetone and 2.72 Kg initiator solution, in sequence. The initiator solution concentration was 8.0 percent ADVA and 4.7 percent AIBN. The reactor was evacuated until the acetone boiled (about 20–25" Hg), then pressured to 20 psi with nitrogen. This was repeated and the reactor once again evacuated to 20" Hg. The vacuum was broken by charging 30.22 lbs. of butadiene. The mixture was heated to reaction temperature, 75° C. and allowed to react for approximately 26 hours. During polymerization, additional initiator mixture and acrylonitrile were metered into the reaction vessel. Conventional techniques were used to recover the product which had an acid number of 13.3, viscosity at 27° C. of 202,000 mPa's and a bound acrylonitrile content of 25.9 percent.

EXAMPLE 2A

Blended Product Statistical Monofunctional Carboxyl-Terminated Reactive Liquid Polymer A blended product statistical monofunctional carboxyl-terminated polymer was obtained in the following experiment. First, the non-functional polymer was prepared in the following manner. A 15 gallon reactor was cooled to 25° C. and evacuated to suck in 4.0 lbs. acrylonitrile, 11.7 lbs. acetone and 18 lbs. initiator solution, in sequence. The initiator solution concentration was 15.0 percent VAZO67. The reactor was evacuated until the acetone boiled (about 20-25" Hg), then pressured to 20 psi with nitrogen. This was repeated and the reactor once again evacuated to 20" Hg. The vacuum was broken by charging 32.0 lbs. of butadiene. The mixture was heated to a reaction temperature of 85° C. and allowed to react for approximately 20 hours. During polymerization, additional initiator mixture and acrylonitrile were metered into the reaction vessel. Conventional techniques were used to recover the product which had viscosity at 27° C. of 36,700 mPa·s and a bound acrylonitrile content of 17.2 percent.

Next, the difunctional carboxyl-terminated polymer was synthesized in the following manner. A 15 gallon reactor was cooled to 25° C. and evacuated to suck in 4.2 lbs. acrylonitrile, 12.3 lbs. acetone and 2.5 lbs. initiator solution, in sequence. The initiator solution concentration was 16.3 percent ADVA. The reactor was evacuated until the acetone boiled (about 20-25" Hg), then pressured to 20 psi with nitrogen. This was repeated and the reactor once again evacuated to 20" Hg. The vacuum was broken by charging 34.7 lbs. of butadiene. The mixture was heated to reaction temperature of 85° C. and allowed to react for approximately 20 hours. During polymerization, additional initiator mixture and acrylonitrile were metered into the reaction vessel. Conventional techniques were used to recover the product which had an acid number of 30.0, viscosity at 27° C. of 117,000 mPa·s and a bound acrylonitrile content of 17.7 percent.

The synthesized difunctional and non-functional terminated polymers then were brought together and blended in a suitable glass or steel container of sufficient size using a suitable stirrer, at a temperature of about 60° C.

The invention will be better understood by reference to the following further examples, which are directed to the formation of the epoxy-terminated form of the reaction and blended product statistical monofunctional polymers useful in the present invention.

EXAMPLE 3

Reaction Product Statistical Monofunctional Epoxy-Terminated Reactive Liquid Polymer To a suitably sized reaction vessel was charged 400 grams of the reaction product statistical monofunctional carboxyl-terminated RLP of Example 1, and 34.7 grams of Epon 828, that is, DGEBA, at a molar ratio of approximately 1:1. 0.05 grams of triphenyl phosphine was added as a catalyst. In the presence of a nitrogen blanket, the temperature of the reaction vessel was raised to approximately 130° C. and the reaction continued until the acid number was generally less than 0.6. The reaction time was approximately 20 hours to reach completion. The reaction product statistical monofunctional epoxy-terminated reactive polymer had a viscosity of 339,000 mPa·s at 27° C. In contrast, a similar reaction utilizing a difunctional carboxyl-terminated reactive polymer yielded a viscosity in excess of 2,000,000.

EXAMPLE 4

Reaction Product Statistical Monofunctional Epoxy-Terminated Reactive Liquid Polymer An epoxy-terminated reactive polymer H was made utilizing the same procedure as in Example 3 except that the reaction product statistical monofunctional carboxyl-terminated RLP of Example 2, and 600 grams of Epon 828 was utilized. The molar ratio was thus approximately 17.3. No catalyst was utilized and the reaction was completed in about 4.5 hours. The reaction product statistical epoxy-terminated reactive polymer had a viscosity of 91,000 mPa·s at 27° C. In contrast, a control utilizing the same reactants and amounts except that a difunctional carboxyl-terminated reactive polymer was utilized, yielded a product having a viscosity of from about 300,000 to about 600,000 mPa·s at 25° C.

EXAMPLE 5

Reaction Product Statistical Monofunctional Epoxy-Terminated Reactive Liquid Polymer In a suitably sized reaction vessel was added equal parts by weight of the reaction product statistical monofunctional carboxyl-terminated RLP of Example 2, and the diglycidyl ether of cyclohexane dimethanol. Under a blanket of nitrogen, the reaction temperature was raised to 130° C. and reacted until the Acid No. was <0.6. The reaction required 4.5 hours to reach completion. The final statistical monofunctional epoxy-terminated reaction product had a viscosity of 8600 mPa·s at 27° C. (The same reaction with a standard difunctional RLP gives an adduct with a viscosity of 15,000-25,000 mPa·s at 25° C.) Molar Ratio RLP/Epoxy —1:8.6.

EXAMPLE 6

Reaction Product Statistical Monofunctional Epoxy-Terminated Reactive Liquid Polymer In a suitably sized reaction vessel was added 200 parts by weight of the reaction product statistical monofunctional carboxyl-terminated RLP of Example 2, and 300 parts of an epoxy novolac (such as DEN-438). Under a blanket of nitrogen was added 2.5 grams (0.5 weight percent) of phosphonium iodide and the reaction temperature was raised to 100° C. The reaction required only 1 hour to reach the desired end point of no titratable acid. The final statistical monofunctional epoxy-terminated adduct had a viscosity of 160,000 mPa·s at 50° C. and 1,980,000 mPa·s at 27° C. (There is no comparable adduct with a difunctional RLP).

EXAMPLE 7

Blended Product Statistical Monofunctional Epoxy-Terminated Reactive Liquid Polymer A blended product statistical monofunctional epoxy-terminated polymer was obtained in the following experiment.

A difunctional epoxy-terminated reactive polymer was made utilizing the procedure of Example 3, except that a statistical dicarboxyl-terminated reactive liquid butadiene-acrylonitrile copolymer containing 16.8 percent acrylonitrile and having a viscosity at 27° C. of about 135,000, and 600 grams of Epon 828 was utilized.

The molar ratio was thus approximately 17.3. No catalyst was used and the reaction was complete in about 5 hours. About 400 grams of a non-functional polymer then was added to the reaction product to form the blended product statistical monofunctional epoxy-terminated reactive polymer. The final product had a viscosity of from about 150,000 to about 230,000 mPa·s at 25° C.

The level of hydroxyl or carboxyl terminated polymers that is used in the preparation of the polyester resins is from about 1 to about 30 parts by weight, and preferably 1 to 15 parts by weight, based on 100 parts of reactant monomers used to prepare the polyester resin. The reactant monomers include the unsaturated dibasic acids or anhydrides, and the polyols.

In accordance with one of the main features of the present invention, RLP additives are admixed with the prereacted unsaturated polyester base resin material set forth above. The following are suitable RLPs for admixing into the prereacted unsaturated polyester resin, (references to statistical monofunctional means both reaction product and blended product compositions): difunctional carboxyl-terminated, hydroxyl terminated, epoxy-terminated polymers, and vinyl-terminated polymers; statistical monofunctional carboxyl-terminated, hydroxyl-terminated, epoxy-terminated and vinyl-terminated reactive liquid polymers, and nonfunctional reactive liquid polymers. All of these polymers are described hereinabove except for the statistical monofunctional vinyl-terminated polymers, which are the reaction product of reaction product statistical monofunctional carboxyl-terminated liquid polymers reacted with glycidyl acrylate or glycidyl methacrylate, as described in U.S. Pat. Nos. 3,910,992; 4,013,710; and 4,129,713 incorporated herein by reference.

The RLP additive is admixed in a conventional manner with the prereacted unsaturated polyester base resin. A suitable curing agent is added to the RLP/base resin admixture. Although addition of the RLP additive preferably occurs prior to cure of the base resin, it is understood that the RLP additive could be admixed into the resin system during cure in the presence of heat without affecting the concept of the present invention. From about 2 to about 30 parts, desirably from about 2 to about 20 parts, and preferably from about 2 to about 10 parts of the RLP additive based on 100 parts of the base resin, is admixed with the base resin. It is well known to the art and to the literature that addition of amounts of the RLP additive greater than about 30 parts per 100 parts of the base unsaturated polyester resin would result in reduction in the thermomechanical properties of the base resin.

Any free radical source, which are well known to those skilled in the art, can be used as a curing agent such as free radical peroxides. Such curing agents are utilized in an amount of from about 0.5 to about 4 parts, and preferably from about 1 to about 2 parts per 100 parts of the base resin. Curing temperature and time will vary depending upon the peroxide used. The cure may be conducted at room temperature, typically for seven (7) days or at elevated temperatures in one or two stages. Suitably the system is cured in a conventional Teflon ®-coated aluminum mold and heated for one hour at from about 40 to about 80° C. with 60° C. being preferred, and then for an additional 2 hours at from about 100° to about 150° C. with 120° C. being preferred.

In accordance with one of the key features of the present invention, although not being fully understood, it is believed that admixture of the RLP additive with the prereacted unsaturated polyester base resin and subsequent heating during cure of the resin system causes the RLP additive to miscibilize or become uniformly dispersed with the base resin, thus generally preventing phase separation of the RLP additive and the base resin. More particularly, it is thought that the rubber particles of the RLP additive physically associate or affiliate with the rubber particles previously reacted into the backbone of the base resin due to the similarity and polarity of the elastomers, and further due to thermodynamic factors which occur during mixing of the free RLP into the base resin and heating of the resin system during cure. Again, it is thought that the rubber particles of the RLP additive merely physically associate or affiliate with the rubber particles reacted into the backbone of the base resin, rather than react therewith, so that such additive rubber particles are considered to be free or unreacted upon admixture into the base resin. Curing of the admixed resin system in the presence of a suitable curing agent and heat results in the modified unsaturated polyester resin system of the present invention, which is a cross-linked thermoset system.

Following are the recipes and methods for making the polymers used in the recipes of the experiments in Examples 12 and 13, the results of which are summarized in Tables III and IV.

Control—Unsaturated Polyester Resin Unmodified

Isophthalic acid (2 moles) was placed in a reaction kettle equipped with a mechanical stirrer and surmounted by a packed column steam condenser and standard distillation head. Propylene glycol (3 moles) was added and the kettle equipped with a thermometer and nitrogen sparge placed so that they extend below the resin surface. The reaction was heated to 180° C. until 65 ml of water had distilled. The reaction was cooled to 160° C. and maleic anhydride (2 moles), quinone (220 ppm) and another 1.4 moles of propylene glycol was added. The temperature was raised to 210° C. and the reaction continued until the resin had an acid number of 50±2. The reaction was then poured into a glass pan, cooled and then dissolved in styrene.

Unsaturated Polyester Resin Modified With Difunctional Epoxy-Terminated RLP

Isophthalic acid (2 moles) was placed in a reaction kettle equipped with a mechanical stirrer and surmounted by a packed column steam condenser and standard distillation head. Propylene glycol (4.4 moles) was added along with 64.5 g of an epoxy terminated polybutadiene/acrylonitrile polymer (ETBN). The ETBN was made by reacting 300 g of HYCAR ™ 1300×13 reactive liquid polymer (difunctional carboxyl-terminated RLP having a butadiene −26% bound acrylonitrile backbone) with 63.9 g of Epon 828 epoxy (DGEBA with an epoxy equivalent weight of about 190). The kettle was equipped with a thermometer and nitrogen sparge placed so that they extend below the resin surface. The reaction was heated to 180° C. until 65 ml of water had distilled. The reaction as cooled to 160° C. and maleic anhydride (2 moles) and quinone (220 ppm) was added. The temperature was raised to 210° C. and the reaction continued until the resin had an

Unsaturated Polyester Resin Modified With Reaction Product Statistical Monofunctional Epoxy-Terminated RLP Isophthalic acid (2 moles) was placed in a reaction kettle equipped with a mechanical stirrer and surmounted by a packed column steam condenser and standard distillation head. Propylene glycol (4.4 moles) was added along with 73.9 g of an epoxy terminated polybutadiene/acrylonitrile polymer (ETBN). The ETBN was made by reacting 300 g of Hycar™ 1355×13 reactive liquid polymer (reaction product statistical monofunctional carboxyl terminated RLP having a butadiene −26% bound acrylonitrile backbone) with 117 g of Epon 1002 epoxy (DGEBA with an epoxy equivalent weight of about 600–700). The kettle was equipped with a thermometer and nitrogen sparge placed so that they extended below the resin surface. The reaction was heated to 180° C. until 65 ml of water had distilled. The reaction was cooled to 160° C. and maleic anhydride (2 moles) and quinone (220 ppm) was added. The temperature was raised to 210° C. and the reaction continued until the resin had an acid number of 50±2. The resin was poured into a glass pan, cooled and then dissolved in styrene.

Unsaturated Polyester Resin Modified With Difunctional Hydroxyl-Terminated RLP Isophthalic acid (2 moles) was placed in a reaction kettle equipped with a mechanical stirrer and surmounted by a packed column steam condenser and standard distillation head. Propylene glycol (4.4 moles) was added along with 53.2 g of a hydroxyl terminated polybutadiene/acrylonitrile polymer (HTBN), Hycar™ 1300×34 reactive liquid polymer. The kettle was equipped with a thermometer and nitrogen sparge placed so that they extend below the resin surface. The reaction was heated to 180° C. until 65 ml of water had distilled. The reaction was cooled to 160° C. and maleic anhydride (2 moles) and quinone (220 ppm) was added. The temperature was raised to 210° and the reaction continued until the resin had an acid number of 50±2. The resin was poured into a glass pan, cooled and then dissolved in styrene.

The recipes set forth below in Table III were prepared in the following manner. A difunctional epoxy-terminated butadiene-acrylonitrile type copolymer additive containing 17 percent bound acrylonitrile, which is sold commercially as a 50 percent solution in styrene by The B. F. Goodrich Company of Akron, Ohio, U.S.A. under the label ETBN, 1300×40, was admixed with: an unsaturated polyester resin control (unmodified unsaturated polyester resin) base dissolved in styrene in Recipes 2 through 4 and to an unsaturated polyester resin modified with difunctional hydroxyl-terminated reactive liquid polymer (HTBN 1300×34 containing 26% bound acrylonitrile) and dissolved in styrene in Recipes 5 through 7. Cobalt napthenate (cobalt napt. 10%) and methylethyl ketone (MEK) peroxide curing agent then were added to the mixture which was placed in Teflon ® resin coated aluminum molds to a sample thickness of about ¼ inch. All recipes were cured for one hour at 60° C. and subsequently for 2 hours at 120° C. Also set forth is the total rubber content of the modified unsaturated polyester system. Mechanical properties were measured using ASTM procedure D-638, and fracture energies were measured using ASTM procedure E-399 using a compact tension specimen. Glass transitions (Tg) were measured using a Mettler DSC instrument.

The data in Table III shows about a two fold increase in fracture energy $G_{IC}$ for admixing ETBN into the unmodified unsaturated polyester resin of recipe 1 which is free of rubber, to one that contains 10.4 parts per 100 parts of the base resin rubber content of recipe 4. Admixing ETBN, 1300×40 into the HTBN, 1300×34 modified polyester resin shows a three fold increase in fracture energy $G_{IC}$, recipe 7, for 10.3 phr (parts by weight per hundred parts polyester resin). At lower levels of total rubber (reactive liquid polymer) content (such as about 4 phr) the additive method and the pre-reacted/additive method give about the same results. This is believed to be in part due to the very brittle nature of the unsaturated polyester resin.

TABLE III

| RECIPE | 1 | 2 | 3 | 4 | 5 | 6 | 7 |
|---|---|---|---|---|---|---|---|
| Unsaturated Polyester Resin-Control | 60 | 60 | 60 | 60 | 0 | 0 | 0 |
| Unsaturated Polyester Resin Modified with difunctional hydroxyl-terminated RLP (26% bound acrylonitrile) | 0 | 0 | 0 | 0 | 60 | 60 | 60 |
| STYRENE | 40 | 40 | 40 | 40 | 40 | 40 | 40 |
| Difunctional Epoxy-RLP (17% bound acrylonitrile) | 0 | 9.5 | 18 | 25 | 0 | 8 | 15 |
| Cobalt Napt. (10%) | 0.5 | 0.5 | 0.5 | 0.5 | 0.5 | 0.5 | 0.5 |
| MEK Peroxide | 2 | 2 | 2 | 2 | 2 | 2 | 2 |
| Tot. Rubber Cont. (phr*) | 0.0 | 4.0 | 7.5 | 10.4 | 4.0 | 7.4 | 10.3 |
| PROPERTIES AFTER CURING ONE HOUR AT 60° C. AND TWO HOURS AT 120° C. | | | | | | | |
| Ten. Stg., psi | 5180 | 6060 | 6240 | 3760 | 5690 | 5450 | 5250 |
| Elongation, % | 1.03 | 1.55 | 2.15 | 1.37 | 1.15 | 1.43 | 1.37 |
| Modulus, GPa | 3.53 | 3.35 | 2.54 | 2.73 | 3.34 | 2.95 | 3.03 |
| KIc, MN/m3/2 | 0.526 | 0.647 | 1.736 | 0.674 | 0.635 | 0.779 | 0.891 |
| GIc, J/m2 | 74.3 | 110.5 | 162.4 | 147.2 | 106.8 | 184.9 | 231.7 |
| Tg, C | 0 | 4 | 7.5 | 10.4 | 4 | 7.4 | 10.3 |

*parts by weight per hundred parts polyester resin

EXAMPLE 13

The recipes 8-13 set forth below in Table IV were prepared and tested in the same manner as the recipes of Table III of Example 12.

The data of Table IV shows improvements in fracture energy for ETBN, 1300×40 admixed with ETBN modified unsaturated polyester resin and for unsaturated polyester resin modified with a statistical monofunctional epoxy terminated based on 1355×13 and Epon 1002 over those for ETBN added to the unsaturated polyester resin control of Table III.

More particularly recipes 10 and 13 with 10.3 phr of total rubber content show 31 and 10% increases in fracture energy over ETBN admixed with the unmodified unsaturated polyester resin, Recipe 4, Table III.

TABLE IV

| RECIPE | 8 | 9 | 10 | 11 | 12 | 13 |
|---|---|---|---|---|---|---|
| Unsaturated Polyester Resin Modified with Difunctional Epoxy-RLP (26% acrylonitile) | 60 | 60 | 60 | 0 | 0 | 0 |
| Unsaturated Polyester Resin Modified w/Statistical Monofunctional Epoxy Terminated RLP (26% acrylonitrile) | 0 | 0 | 0 | 60 | 60 | 60 |
| STYRENE | 40 | 40 | 40 | 40 | 40 | 40 |
| Difunctional Epoxy-RLP (17% bound acrylonitrile) | 0 | 8 | 15 | 0 | 8 | 15 |
| Cobalt Napt. (10%) | 0.5 | 0.5 | 0.5 | 0.5 | 0.5 | 0.5 |
| MEK Peroxide | 2 | 2 | 2 | 2 | 2 | 2 |
| Tot. Rubber Cont. (phr*) | 4.0 | 7.4 | 10.3 | 4.0 | 7.4 | 10.3 |
| PROPERTIES AFTER CURING ONE HOUR AT 60° C. AND TWO HOURS AT 120° C. | | | | | | |
| Ten. Stg., psi | 6140 | 6100 | 5010 | 5430 | 6500 | 6490 |
| Elongation, % | 1.21 | 1.52 | 1.42 | 1.01 | 1.57 | 1.85 |
| Modulus, GPa | 3.95 | 3.05 | 2.77 | 4.47 | 3.10 | 2.94 |
| KIc, MN/m3/2 | 0.585 | 0.778 | 0.776 | 0.621 | 0.73 | 0.734 |
| GIc, J/m2 | 76.6 | 175.5 | 192.3 | 76.3 | 152.0 | 162.1 |
| Tg, C | 4 | 7.4 | 10.3 | 4 | 7.4 | 10.3 |

*parts by weight per hundred parts polyester resin

Although the invention has been described in terms of specific embodiments of a manner in which the invention may be practiced, this is by way of illustration only and the invention is not necessarily limited thereto since alternative embodiments and operating techniques will become apparent to those skilled in the art. Accordingly, modifications are contemplated which can be made without departing from the spirit of the described invention.

We claim:

1. An unsaturated polyester resin composition having improved fracture toughness comprising: a blend of
   (a) a modified unsaturated polyester resin comprising the reaction product of an unsaturated dibasic acid and/or anhydride, a polyol and a reactive liquid polymer; and
   (b) additive reactive liquid polymer, said composition having a cured fracture energy ($G_{IG}$) of more than about 100 Joules per square meter.

2. The composition of claim 1 wherein the reactive liquid polymer reacted into the unsaturated polyester resin is a difunctional terminated reactive liquid polymer or a statistical monofunctional reactive liquid polymer.

3. The composition of claim 2 wherein the difunctional terminated reactive liquid polymer is dicarboxyl, dihydroxyl, or diepoxy terminated.

4. The composition of claim 2 wherein the statistical monofunctional reactive liquid polymer is a reaction product polymer or a blended product polymer.

5. The composition of claim 4 wherein the statistical monofunctional reactive liquid polymer has carboxyl, hydroxyl or epoxy monofunctionality.

6. The composition of claim 3 wherein the difunctional terminated reactive liquid polymer has a carbon-carbon backbone derived from the polymerization of at least one vinylidene monomer having at least one terminal $CH_2=C<$ group.

7. The composition of claim 6 wherein said carbon-carbon backbone of said difunctional terminated reactive liquid polymer is derived from the copolymerization of butadiene and acrylonitrile.

8. The composition of claim 6 wherein said carbon-carbon backbone contains from about 50% to about 100% by weight butadiene, from about 0% to about 40% by weight acrylonitrile and from about 0% to about 40% by weight carboxyl.

9. The composition of claim 8 wherein the reactive liquid polymer reacted into the backbone of the unsaturated polyester resin is difunctional epoxy-terminated reactive liquid polymer and the additive reactive liquid polymer is difunctional epoxy-terminated.

10. The composition of claim 9 wherein the difunctional epoxy-terminated reactive liquid polymer reacted into the backbone of said unsaturated polyester resin is an epoxy-terminated copolymer having a backbone derived from the copolymerization of 1,3-butadiene and about 26% by weight acrylonitrile and the additive difunctional epoxy-terminated reactive liquid polymer is a copolymer having a backbone derived from the copolymerization of 1,3-butadiene and about 17% acrylonitrile.

11. The composition of claim 8 wherein the reactive liquid polymer reacted into the backbone of the unsaturated polyester resin is difunctional hydroxy-terminated reactive liquid polymer and the additive reactive liquid polymer is difunctional epoxy-terminated.

12. The composition of claim 11 wherein the difunctional hydroxy-terminated reactive liquid polymer having a backbone derived from the copolymerization of 1,3-butadiene and about 26% by weight acrylonitrile and the difunctional epoxy-terminated reactive liquid polymer is a copolymer having a backbone derived from the copolymerization of 1,3-butadiene and about 17% by weight acrylonitrile.

13. The composition of claim 8 wherein the reactive liquid polymer reacted into the backbone of the unsaturated polyester resin is statistical monofunctional epoxy-terminated reactive liquid polymer and the additive reactive liquid polymer is difunctional epoxy-terminated.

14. The composition of claim 13 wherein the statistical monofunctional epoxy-terminated reactive liquid polymer is a reaction product statistical monofunctional epoxy-terminated polymer and the difunctional epoxy-terminated polymer is a copolymer having a backbone derived from the copolymerization of 1,3-butadiene and about 17% by weight acrylonitrile.

15. The composition of claim 1 wherein the reactive liquid polymer reacted into the unsaturated polyester resin is a mixture of difunctional epoxy-terminated polymer, monofunctional epoxy-terminated polymer and non-functional polymer and said polymer has a functionality of from about 0.004 to about 1.8.

16. The composition of claim 1 wherein the additive reactive liquid polymer is a difunctional-terminated polymer, a reaction product statistical monofunctional polymer, a blended product statistical monofunctional polymer; and wherein said polymers have a functionality of carboxyl, hydroxyl, epoxy or vinyl.

17. The composition of claim 1 wherein the additive reactive liquid polymer is a non-functional reactive liquid polymer.

18. A method of fracture toughening unsaturated polyester resins comprising admixing reactive liquid polymer with an unsaturated polyester resin comprising the reaction product of an unsaturated dibasic acid and/or anhydride, a polyol and reactive liquid polymer.

19. A shaped article comprising an unsaturated polyester resin composition having improved fracture toughness comprising a blend of
   (a) a modified unsaturated polyester resin comprising the reaction product of an unsaturated dibasic acid and/or anhydride, a polyol and a reactive liquid polymer; and
   (b) additive reactive liquid polymer.

20. A process for producing an unsaturated polyester resin having improved fracture toughness comprising admixing reactive liquid polymer with an unsaturated polyester resin comprising the reaction product of an unsaturated dibasic acid and/or anhydride, a polyol and reactive liquid polymer.

21. A curable unsaturated polyester resin composition having improved fracture toughness comprising:
   (a) an unsaturated polyester resin comprising the reaction product of an unsaturated dibasic acid and/or anhydride, a polyol and a reactive liquid polymer;
   (b) additive reactive liquid polymer; and
   (c) a free radical source curing agent.

22. The composition of claim 1 wherein the total reactive liquid polymer is present in an amount of at least 10 phr.

* * * * *